Feb. 26, 1924.

T. J. STURTEVANT 1,485,205

APPARATUS FOR AGITATING MATERIALS

Filed Feb. 19, 1923   3 Sheets-Sheet 2

INVENTOR:
Thomas J. Sturtevant
BY
Henry T. Williams,
ATTORNEY.

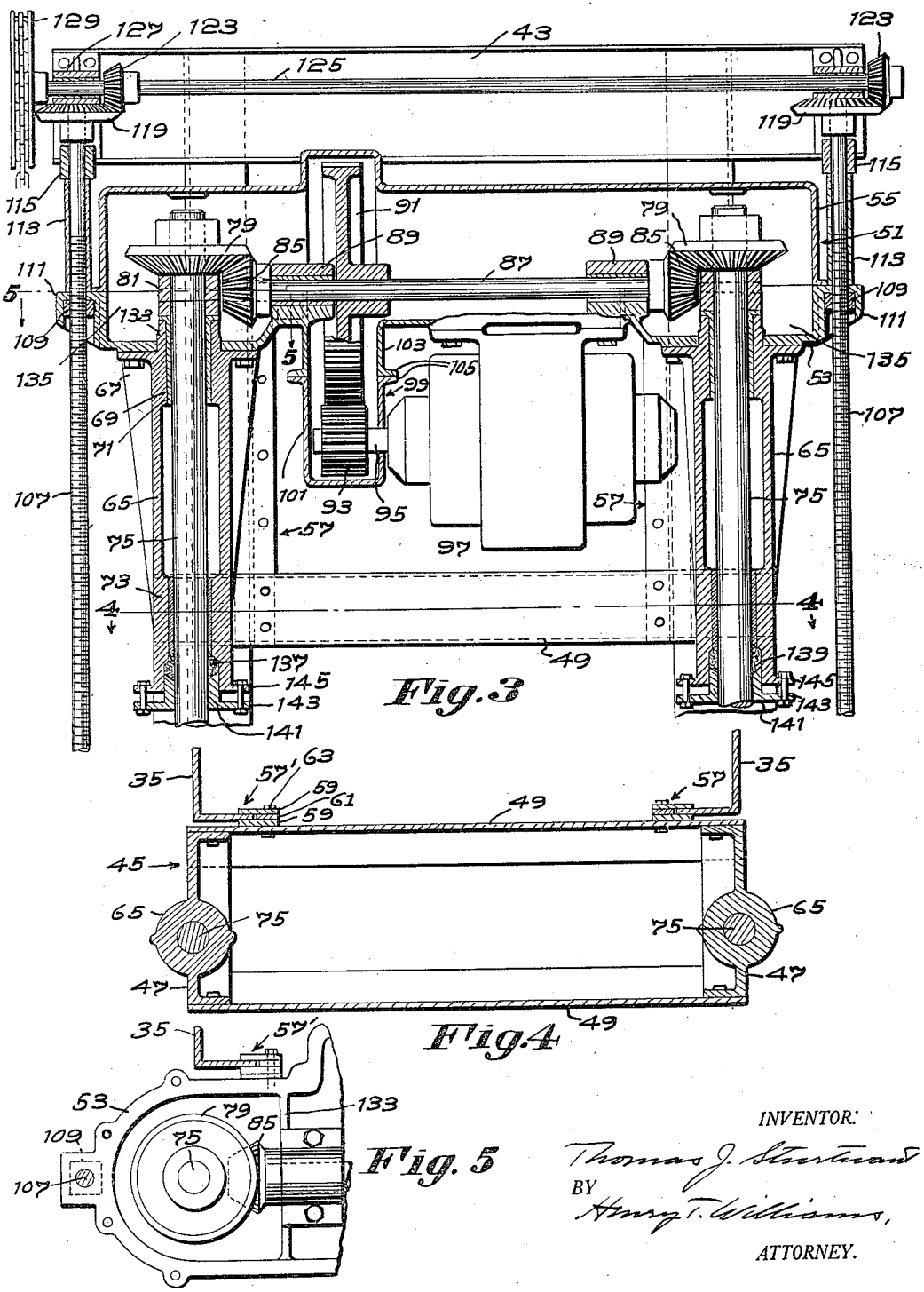

Patented Feb. 26, 1924.

1,485,205

UNITED STATES PATENT OFFICE.

THOMAS J. STURTEVANT, OF WELLESLEY, MASSACHUSETTS, ASSIGNOR TO STURTEVANT MILL COMPANY, OF BOSTON, MASSACHUSETTS, A CORPORATION OF MASSACHUSETTS.

APPARATUS FOR AGITATING MATERIALS.

Application filed February 19, 1923. Serial No. 619,815.

*To all whom it may concern:*

Be it known that I, THOMAS J. STURTEVANT, a citizen of the United States, residing at Wellesley, in the county of Norfolk and State of Massachusetts, have invented certain new and useful Improvements in Apparatus for Agitating Materials, of which the following is a specification.

The invention to be hereinafter described relates to apparatus for use in the manufacture of mortar and plaster.

In making mortar and plaster in a factory, water is added to lime to slake the same, and after being thoroughly mixed, the slaked lime is delivered to a vat or vats and allowed to stand a sufficient length of time properly to age the same.

It is desirable to agitate, beat, churn or whip the aged lime putty to improve the consistency, smoothness, lightness, and increase the bulk of the product. Also, the agitation of the aged lime putty is desirable to facilitate delivery of the same from the vat to the point desired.

The aim and purpose of the present invention is to provide apparatus whereby the agitation of the aged lime putty may be accomplished in a more thorough, efficient, practicable manner than has hitherto been possible.

In carrying the invention into practical effect, in the present instance, a pair of propellers or beaters are mounted on a carriage and are rapidly rotated by an electric motor violently to agitate or churn the materials in the vat. The carriage is provided with a motor and a suitable transmission whereby the propellers may be moved laterally through the vat. The construction and arrangement of the propellers are such that they may reach substantially the entire area of the vat, and thereby effectively agitate the entire contents of the vat.

The character of the invention may be best understood by reference to the following description of one good form thereof shown in the accompanying drawings, wherein.

Figure 1:
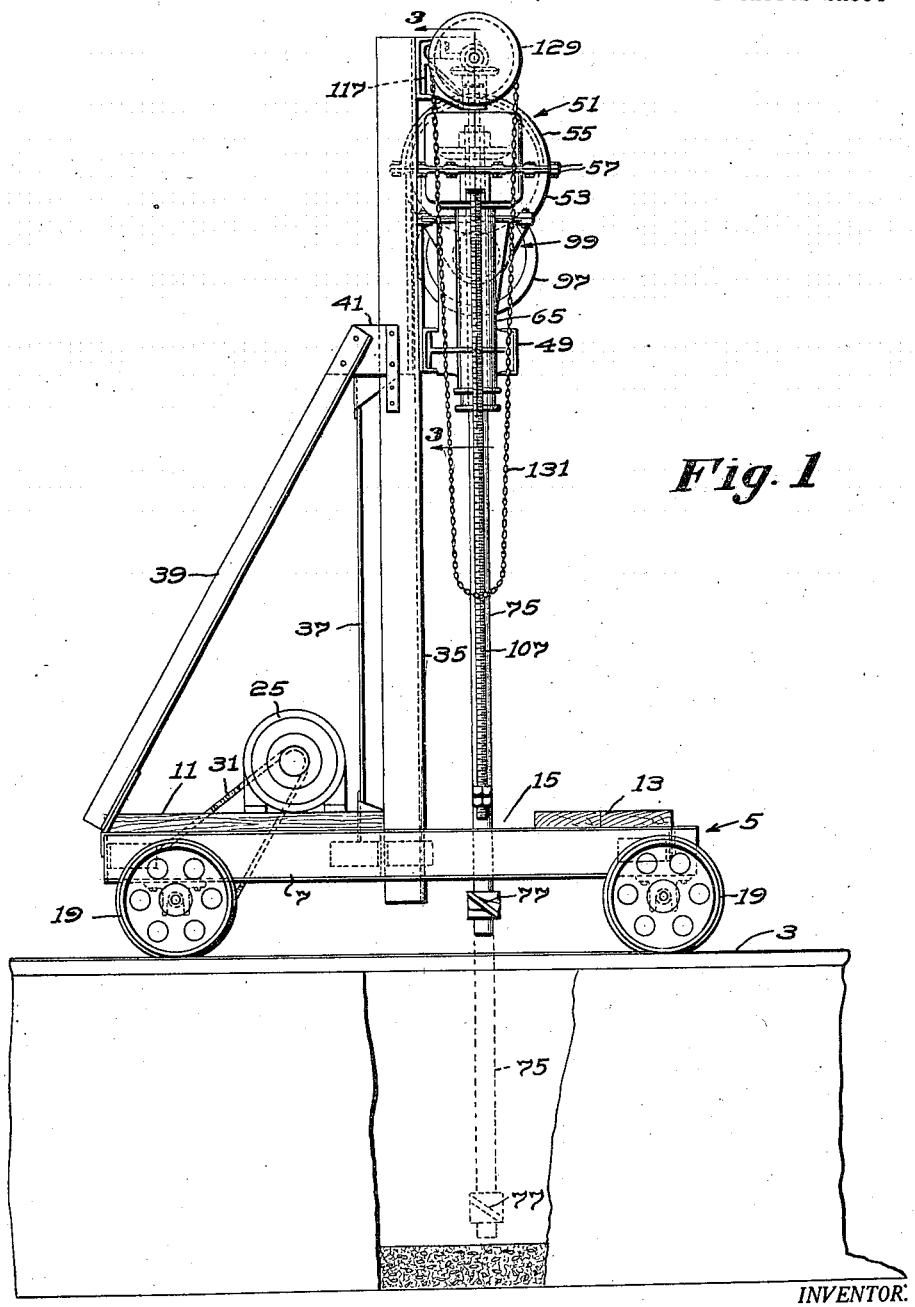
Fig. 1 is a side elevation of agitating apparatus embodying the invention, the apparatus being mounted on a vat, a wall of which is partly broken away to disclose parts in the vat.
Figure 2:
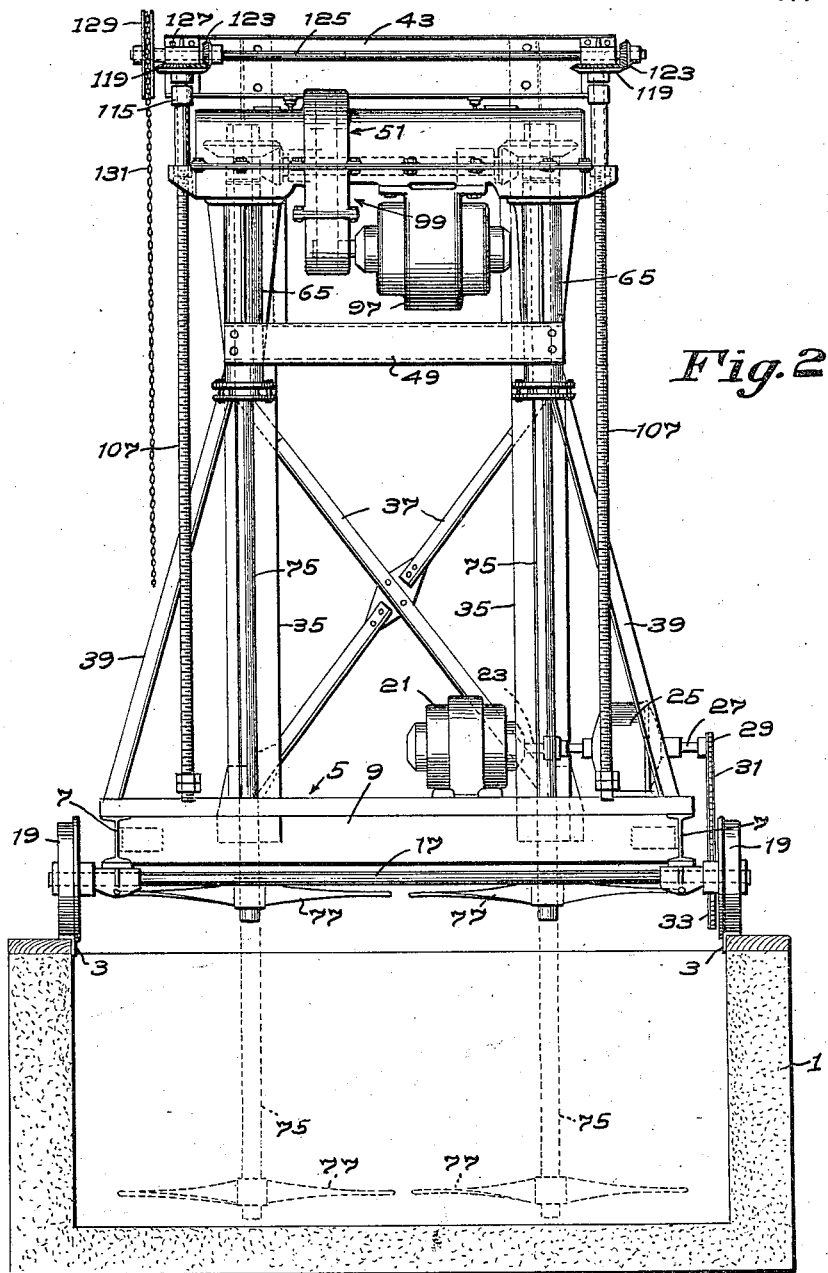
Fig. 2 is a front elevation of the apparatus mounted on a vat which is shown in vertical section.

Fig. 3 on an enlarged scale is a vertical section taken on line 3—3 of Fig. 1;

Fig. 4 is a horizontal section taken on line 4—4 of Fig. 3; and

Fig. 5 is a horizontal section taken on line 5—5 of Fig. 3.

Referring to the drawings, 1 designates a vat which may be constructed of concrete or other suitable material. This vat is rectangular and has a length substantially greater than the width thereof. Rails 3, conveniently of angle iron form are mounted on the upper edges of opposed side walls of the vat, and serve to support the agitating apparatus, which will now be described.

This apparatus, in the present instance of the invention, comprises a carriage 5 provided with a frame consisting of I-bars 7 connected by cross members 9. Mounted on the frame are a rear platform 11 and a front platform 13, said platforms being separated to leave a substantial space 15 between them. Suitably secured to the I-bars 7 are a pair of shafts 17 provided with flanged wheels 19 adapted to roll along the tracks 3 referred to.

To propel the carriage slowly along the tracks, an electric motor 21 is mounted on the rear platform 11, and has a shaft 23 connected to a planetary reduction gear mechanism enclosed in a casing 25 mounted on said platform. Since this planetary gear mechanism is of usual well known construction, it is unnecessary to disclose and describe the same herein. Projecting from the planetary gear casing is a shaft 27 carrying a sprocket wheel 29 connected by a sprocket chain 31 with a larger sprocket wheel 33 mounted on one of the carriage shafts 17.

The construction is such that the motor and transmission will serve to drive one of the shafts 17 and propel the carriage along the rails on top of the vat. The carriage may be fed in opposite directions by rotating the motor in opposite directions under the control of a usual reversing switch.

Mounted on the carriage are a pair of uprights or guides 35 conveniently of angle form. The lower ends of these uprights are suitably secured to the carriage, and said uprights are provided with a pair of cross braces 37 and inclined braces 39 having their upper ends secured to plates 41 secured to the uprights, and their lower ends suitably secured to the carriage. To the upper ends of the uprights is secured a cross channel 43. The construction is such that a strong, rigid frame is provided.

Mounted on the supports or guides is a carrier 45, in the present instance, comprising end channels 47 connected to side channels 49. Above the frame formed by the channels 47 and 49 is a casing 51 comprising a bottom part 53 and an upper part 55 having outstanding flanges 57 (Fig. 1) secured together by suitable bolts.

The bottom part 53 of the casing and one of the channels 49 are connected by a pair of shoes 57', each comprising a pair of bars 59 and an intermediate narrower bar 61, said bars being secured together and to one of the channels 49 by bolts 63. These shoes are adapted to slide along the inturned flanges of the angle iron uprights.

Depending from the bottom part 53 of the casing are a pair of hangers 65 of tubular form. At the upper ends of the hangers are outstanding flanges 67 bolted to the bottom part of the casing. Each of these hangers is formed to present an upper bearing 69 receiving a bushing 71 and a lower bearing 73.

Mounted in the bearings of the hangers are a pair of vertical shafts 75 having agitating propellers, saddles or blades 77 adjacent to but spaced somewhat from the lower ends of the shafts. The shafts project upward through the hangers into the casing 51, and have bevel gears 79 fast thereon. These bevel gears have hubs 81 which rest on bearing collars 83 formed on the upper ends of the hangers and projecting upward somewhat in the casing, the construction being such that the shafts are supported on the hangers, and are prevented from sliding downward therethrough.

Meshing with the bevel gears 79 are bevel pinions 85 fast on a horizontal shaft 87 journalled in bearings mounted on the lower part of the casing. Fast on the shaft 87 is a large gear 91 meshing with a pinion 93 mounted on the shaft 95 of an electric motor 97 which is secured to and depends from the bottom part of the casing 51. The pinion 93 and a portion of the gear 91 are enclosed in a housing 99 comprising a bottom part 101 and an upper part 103, said parts being provided with outstanding flanges 105 bolted together. The motor will operate through the pinion 93, gear 91, bevel pinions 85 and bevel gears 79 to rotate the propeller shafts at high speed, such, for example, as 150 or 200 R. P. M.

Suitable means may be provided for supporting the carrier 45 and for moving the same up or down along the upright guides 35. This means, in the present instance, comprises a pair of vertical screw shafts 107 threaded in nuts 109 mounted in sockets in brackets 111 secured to opposite ends of the bottom part 53 of the casing 51. The screw shafts project upward through sleeves 113 rising from the brackets 111. The screw shafts also project upward through bearings 115 carried by brackets 117 secured to the cross channel 43 referred to, at the top of the frame on the carriage.

Fast on the upper ends of the screw shafts are bevel gears 119 having hubs 121 adapted to rest on the upper ends of the bearings 115, and thereby support the screw shafts. Meshing with the bevel gears 119 are bevel pinions 123 fast on a horizontal shaft 125 journalled in bearings 127 carried by the brackets 117. Fast on one end of the horizontal shaft 125 is a grooved wheel 129 adapted to receive an endless chain 131 which depends from the wheel 129 to a point where it is within convenient reach of the operator.

The construction is such that the operator may grasp the chain 131 and rotate the wheel 129, the shaft 125 and bevel pinions 123. The latter in turn will rotate the bevel gears 119, thereby to rotate the screw shafts, and the latter operating through the nuts 109 will cause the carrier to move up and down along the uprights and cause the propellers to move down into the vat or rise upward therefrom.

The bottom part 53 of the casing may have walls 133 rising upward therein adjacent the bevel pinions 85, the construction being such that pockets 135 are provided which may receive a supply of oil for lubricating the bearings 89. The oil may work down through the bearings 69 along the vertical shafts and thence through the hangers to the lower bearings 73. To prevent escape of oil through the lower ends of the hangers, they may be provided with counter-bores 137 receiving packing 139 which may be confined in the counter-bores by suitable glands 141 having flanges 143 bolted to flanges 145 at the lower ends of the hangers. The motor pinion housing 99 may also receive a supply of oil for lubricating the parts therein.

In operation, the screw shafts 107 are rotated to lower the carrier, and thereby lower the propellers into the vat. The propeller shafts will be rotated by the motor on the carrier at high speed, thereby thoroughly to agitate the materials in the vat. The motor 21 may propel the carriage along the upper edge of the vat, and thereby progressively move the propellers laterally through the material in the vat. The combined orbits of the propellers and their lateral feed will enable them to reach and agitate the materials substantially throughout the area of the vat. The bottom of this vat is usually inclined to facilitate flow of the materials out through one end of the vat. The operator may vary the elevation of the carrier and the propellers to compensate for the inclination of the bottom of the vat.

The rapidly rotated blades or propellers beat, whip and stir the aged lime putty, thereby improving the consistency, smoothness and lightness of the product. Also, the effect of the blades is to violently throw the materials upward and aerate the same. This action of the propellers tends to pull the same downward, and thereby pulls the propeller shafts downward as limited by the collars at the tops of the bearing hangers for the shafts.

The vat is usually provided with a platform at one end thereof on which the operator may stand in opening and closing the gates or valves at the discharge end of the vat, said platform being elevated somewhat above the upper edge of the vat.

Since the bracing for the uprights is located wholly at the rear side of the carriage, and there is no mechanism above the front platform of the carriage, the front end of the latter may move beneath the platform mounted on the vat, and thereby enable the carriage to be fed a sufficient distance toward the end of the vat to enable the propellers to reach the material adjacent said end. Since the propellers are spaced somewhat above the lower ends of their shafts, said propellers are prevented from coming in contact with the bottom of the vat in case the shafts should be lowered thereto.

Since the carrier is mounted wholly at one side of the uprights, and there is no structure in front of the carrier, the latter and the parts associated therewith are conveniently accessible. Also, if it should be desired to remove the carrier from the uprights, this may be readily accomplished without the necessity of removing any construction in front of the carrier.

The casing for the transmission mechanism between the carrier motor and the propeller shafts, desirably protects said transmission and the bearings therefor, and the hangers depending from the casing desirably protect the bearings for the propeller shafts, and also the casing and hangers provide a construction which facilitates effective lubrication of the mechanism. Since the transmission is wholly supported by the bottom part of the casing, the upper part of said casing may be readily removed when desired for the purpose of inspection, cleaning or repair of the parts of the mechanism contained in the casing.

The electric motor for rotating the propeller shafts is secured to and depends from the under side of the casing which encloses the transmission for imparting rotation from the motor to the propeller shafts. This is a desirable feature, since it lowers the center of gravity of the carrier and the mechanism thereon, and tends to increase the stability of the construction.

In apparatus for making mortar and plaster, it is customary to employ several concrete vats such as the vat disclosed herein. A suitable transfer apparatus may be provided whereby the agitating apparatus may be transferred from one vat to another, so that it may successively serve to agitate and beat the aged lime putty in the several vats. While the slaked lime is being introduced into one vat, the slaked lime may be aging in another vat, the aged lime putty may be agitated and whipped in another vat, and the lime putty after having been agitated, may be fed from still another vat.

The aged lime putty may be delivered to a mixing apparatus in which the lime putty and sand are thoroughly mixed together for the production of mortar.

By my invention is provided a strong, simple, efficient apparatus whereby the aged lime putty may be effectively agitated and aerated.

It will be understood that the invention is not limited to the specific embodiment shown, and that various deviations may be made therefrom without departing from the spirit and scope of the appended claims.

What is claimed is:

1. Apparatus for agitating material, comprising, in combination, a vat, rails, a carriage having wheels mounted on said rails, an electric motor on the carriage and a transmission for propelling the carriage along the rails, a frame mounted on the carriage, a carrier on said frame, shafts depending from said carrier and having paddles for agitating the material in the vat, an electric motor on the carrier, transmission means between the carrier motor and the paddle shafts for rotating the latter, a pair of upright screws on the carriage threaded to the carrier, and means to rotate said screws to raise or lower the carrier and vary the elevation of the paddles in the vat.

2. Apparatus for agitating material, comprising, in combination, a carriage, a frame on the carriage, a casing having bearing hangers, upright shafts in said bearing hangers, blades fast on said shafts for agitating materials, an electric motor, a transmission mounted in said casing for imparting rotation from said motor to said shafts, and means to move said casing up and down along said frame to vary the elevation of the blades.

3. Apparatus for agitating material, comprising, in combination, a frame having a pair of upright guides, a carrier having shoes movable along said guides, a pair of propeller shafts journalled in and depending from the carrier, propellers on the lower ends of said shafts, an electric motor and a transmission mounted on the carriage for rotating the propeller shafts, a pair of screw shafts having threaded connections with the carrier and having their upper ends supported by said frame, bevel gears on the upper ends of said screw shafts, a horizontal shaft on said frame, bevel gears on said horizontal shaft meshing with the bevel gears on the screw shafts, and manually operable means for rotating the horizontal shaft, thereby to rotate the screw shafts and vary the elevation of the carrier with respect to the carriage.

4. Apparatus for agitating material, comprising, in combination, a carriage, a casing on the carriage, upright shafts journalled in and depending from said casing, propellers on the lower ends of said shafts, bevel gears on the upper ends of said shafts, a horizontal shaft journalled in the casing, bevel gears on the horizontal shaft meshing with the bevel gears on the upright shafts, an electric motor connected to the casing, and gearing in said casing for imparting rotation from the motor to the horizontal shaft.

5. Apparatus for agitating material, comprising, in combination, a carriage, a frame mounted on the carriage, a carrier adapted to slide up and down along and be guided by the frame, a pair of hangers on the carrier, each provided with a pair of bearings, upright shafts, one journalled in the bearings in one of the hangers, and the other shaft journalled in the bearings in the other hanger, propellers on said shafts, means including an electric motor on the carrier for rotating said shafts, and means for adjusting the carrier along the frame and for holding the same at different elevations.

6. Apparatus for agitating material, comprising, in combination, a carriage, upright guide means mounted on the carriage, a carrier movable up and down along the guide means and having a casing provided with hangers having bearings therein, upright shafts journalled in said hanger bearings, propellers fast on the lower ends of said shafts, an electric motor on the carrier, and a transmission in the casing for imparting rotation from the motor to the shafts, said casing being formed to provide pockets for receiving oil for lubricating the transmission and the bearings in the hangers.

7. Apparatus for agitating material, comprising, in combination, a vat, a carriage movable along the vat, a pair of upright guides mounted on the carriage, a carrier adapted to slide along said guides, a pair of shafts journalled in the carrier, propellers at the lower ends of the shafts, an electric motor mounted on the carrier, transmission means for imparting rotation from the motor to the shafts, a housing enclosing the transmission means, said motor being secured to and located beneath said housing, and means including a pair of screws for moving the carrier along said guides to lower the propellers beneath the carriage into the vat, or raise the propellers up from the bottom of the vat.

8. Apparatus for agitating material comprising, in combination, a vat, a carriage adapted to travel along the vat, a frame mounted on the carriage, a casing movable up and down along the frame, bearings in said casing, a pair of upright shafts journalled in said bearings, paddles on said shafts for stirring material in the vat, bearings in said casing, a cross shaft journalled in the latter bearings, intermeshing bevel gears on the upright shafts and the cross shaft, and means including an electric motor carried by the casing for rotating the cross shaft, said casing being formed of detachably connected parts, one of said parts carrying the bearings for the upright shafts and the cross shaft, and the other part being movable to enable ready access to the mechanism in the casing.

9. Apparatus for agitating material comprising, in combination, a vat, a carriage adapted to travel along the vat, a frame mounted on the carriage, a carrier movable to and down along the frame, screw shafts journalled on the frame and having threaded connections with the carrier, a transverse shaft journalled in bearings on the frame, intermeshing bevel gears on the screw shafts and the transverse shaft, manually operable means for rotating the transverse shaft, that the latter may operate through the bevel gears and the screw shafts to move the carrier up and down along the frame, a pair of shafts supported by the carrier, paddles on said shafts for stirring material in the vat, and driving means on the carrier for rotating the paddle shafts.

10. Apparatus for agitating material comprising, in combination, a vat, a carriage movable along the vat, a frame mounted on the carriage, an electric motor mounted on the carriage at one side of the frame for propelling the carriage along the vat, a casing at the opposite side of the frame from said motor, shafts depending from said casing and having paddles for stirring material in the vat, an electric motor carried by the casing, a transmission in the casing for imparting rotation from the motor to the paddle shafts, and means for moving the casing along said frame.

11. Apparatus for agitating material comprising, in combination, a vat having straight opposed sides, a carriage adapted to travel along the vat in a direction parallel to said straight sides, uprights mounted on the carriage, a carrier movable up and down along the uprights, a pair of shafts on the carrier and depending therefrom, paddles on said shafts for stirring material in the vat, and an electric motor and transmission on the carrier for rotating said shafts, the total length of the paddles on the two shafts being substantially equal to the distance between the straight sides of the vat, that they may agitate materials substantially throughout the area of the vat when the carriage is propelled along the vat.

12. Apparatus for agitating material comprising, in combination, a vat, a carriage adapted to travel along the vat, uprights mounted on the carriage, a carrier on the uprights, shafts journalled in and depending from the carrier, paddles on the shafts for agitating material in the vat, said shafts having axes fixed with respect to the carrier, and a transmission on the carrier for rotating said shafts.

13. Apparatus for agitating material comprising, in combination, a vat, a carriage adapted to travel along the vat, upright guide means mounted on the carriage, a casing movable up and down along the guide means and having bearings, upright shafts journalled in said bearings, paddles on said shafts for agitating material in the vat, said casing being formed to provide pockets for receiving oil for lubricating said bearings, and means including an electric motor carried by the casing for rotating said paddle shafts.

14. Apparatus for agitating material comprising, in combination, a vat, a carriage adapted to travel along the vat, uprights mounted on the carriage having guides, a casing movable along said guides, hangers depending from the casing, a cross member connected to the hangers beneath the casing for stiffening the hangers, bearings in said hangers, upright shafts journalled in said bearings, paddles on said shafts for agitating material in the vat, a motor carried by the casing, a transmission in the casing for imparting rotation from the motor to the paddle shafts, and means for moving the casing up and down along the uprights.

THOMAS J. STURTEVANT.